(12) United States Patent
Xiang et al.

(10) Patent No.: US 11,801,471 B1
(45) Date of Patent: Oct. 31, 2023

(54) SUPPORT FRAME APPARATUS FOR A THERMAL FLUID

(71) Applicant: Xi'an Thermal Power Research Institute Co., Ltd, Shaanxi (CN)

(72) Inventors: Xiaofeng Xiang, Shaanxi (CN); Zhichao Wang, Shaanxi (CN); Xiangyu Zhang, Shaanxi (CN); Xiaoyu Lu, Shaanxi (CN); Minghao Li, Shaanxi (CN); Bo Zhang, Shaanxi (CN); Zhonghua Jin, Shaanxi (CN); Ke Zhou, Shaanxi (CN); Wei Yao, Shaanxi (CN)

(73) Assignee: XI'AN THERMAL POWER RESEARCH INSTITUTE CO., LTD, Shaanxi (CN)

( * ) Notice: Subject to any disclaimer, the term of this patent is extended or adjusted under 35 U.S.C. 154(b) by 0 days.

(21) Appl. No.: 18/329,783

(22) Filed: Jun. 6, 2023

(30) Foreign Application Priority Data

Jun. 7, 2022 (CN) .......................... 202210635264.9

(51) Int. Cl.
    *B01D 53/04* (2006.01)

(52) U.S. Cl.
    CPC ..... *B01D 53/0446* (2013.01); *B01D 53/0407* (2013.01); *B01D 2257/504* (2013.01)

(58) Field of Classification Search
    CPC ............... B01D 53/04; B01D 53/0407; B01D 53/0446; B01D 53/0462; B01D 2257/504; B01D 2259/4009; B01D 2259/40086
    USPC .......................................... 96/108, 126, 146
    See application file for complete search history.

(56) References Cited

U.S. PATENT DOCUMENTS

| | | | | | |
|---|---|---|---|---|---|
| 3,734,293 | A | * | 5/1973 | Biskis | B01D 53/0438 210/269 |
| 4,582,516 | A | * | 4/1986 | Kadi | B01D 53/0438 96/146 |
| 5,445,099 | A | * | 8/1995 | Rendina | F28D 1/022 114/140 |
| 6,007,604 | A | * | 12/1999 | Risse | B01D 53/79 96/417 |
| 7,112,239 | B2 | * | 9/2006 | Kimbara | C01B 3/0005 96/108 |
| 7,323,043 | B2 | * | 1/2008 | Finamore | H01M 8/04 206/0.7 |
| 8,778,063 | B2 | * | 7/2014 | Mudawar | C01B 3/0031 165/104.19 |

* cited by examiner

*Primary Examiner* — Frank M Lawrence, Jr.
(74) *Attorney, Agent, or Firm* — Hodgson Russ LLP

(57) ABSTRACT

A support frame apparatus for a thermal fluid includes: a support frame adapted to be coupled to an inner wall of an adsorption device, and defining a chamber therein, a first channel for accommodating the thermal fluid being formed in a wall of the support frame, and a plurality of first holes being formed in the wall of the support frame and being opened to the chamber to spray the thermal fluid into the chamber; and a plurality of support arms disposed within the chamber and each having a first end coupled to the support frame and a second end extended inwardly from the support frame, the support arm defining a second channel therein fluid communicated to the first channel, and the support arm having a plurality of second holes communicated to the second channel and opened to the chamber to spray the thermal fluid into the chamber.

6 Claims, 3 Drawing Sheets

SUPPORT FRAME APPARATUS FOR A THERMAL FLUID

CROSS-REFERENCE TO RELATED APPLICATIONS

This application is a continuation application of Chinese Patent Application No. 202210635264.9, filed on Jun. 7, 2022. The entire disclosure of the above-identified application is incorporated herein by reference.

TECHNICAL FIELD

The present disclosure relates to the technology field of an apparatus for an adsorption device capturing carbon dioxide ($CO_2$), and specifically to a support frame apparatus for a thermal fluid.

BACKGROUND $CO_2$ capture, utilization and storage (CCUS) is one of the most effective ways to achieve large-scale $CO_2$ reductions, where the $CO_2$ capture is an important part in CCUS that needs to be improved due to its high energy consumption and cost. The direct air capture (DAC) technology uses air as the transport medium for $CO_2$ and enriches $CO_2$ directly from air containing a low concentration (400 ppm) thereof, which is flexible and easy to operate, and can deal with $CO_2$ emissions by mobile sources and avoid the cost of $CO_2$ transportation.

The air capture—adsorption/absorption technology captures low concentrations of $CO_2$ in air at room temperature and releases and regenerates the same at a temperature of about 80° C. The desorption and regeneration processes require the provision of a large amount of heat, which accounts for about 75% or more of the energy consumption of the whole system. Despite adsorbents from R&D with high loading contents of active groups and high material stability, the regeneration and desorption processes still requires mutually coupled technologies such as variable temperature and pressure, making the regeneration temperature of air direct $CO_2$ capture still high, even reaching 150 kJ/mol of energy consumption, which greatly restricts the large-scale development of this technology.

However, with respect to the desorption and regeneration processes using $CO_2$ adsorbents, the method and device of providing heat in the related art still follows the traditional material heating technology, resulting in low heating efficiency and uneven heating, and the adsorption device is difficult to be disassembled and installed and has limited arrangement space.

SUMMARY

In order to overcome problems in the related art, embodiments of the present disclosure provide a support frame apparatus for a thermal fluid, which heats the packing in an adsorption device evenly and improves heat supply and heat transfer efficiencies to the adsorption device, with a structure to be easily disassembled and installed, as well as simply arranged, and thus presents wide applications.

According to a first aspect of embodiments of the disclosure, a support frame apparatus for a thermal fluid is provided, where the support frame apparatus includes:

a support frame, adapted to be coupled to an inner wall of an adsorption device, and defining a chamber therein, a first channel for accommodating the thermal fluid being formed in a wall of the support frame, the first channel having an inlet and an outlet opposite to the inlet, and a plurality of first holes being formed in the wall of the support frame and being opened to the chamber so as to spray the thermal fluid into the chamber; and a plurality of support arms disposed within the chamber and each having a first end coupled to the support frame and a second end extended inwardly from the support frame, the support arm defining a second channel therein fluid communicated to the first channel, and the support arm having a plurality of second holes communicated to the second channel and opened to the chamber so as to spray the thermal fluid into the chamber.

In some embodiments, the support frame has a first inner surface and a second inner surface opposed to each other, the plurality of support arms include a first group of support arms coupled to the first inner surface and a second group of support arms coupled to the second inner surface, and the first group of support arms are parallel to each other and spaced both horizontally and vertically, where the second group of support arms are parallel to each other and spaced both horizontally and vertically.

In some embodiments, the first group of support arms are parallel in a first direction and spaced both horizontally and vertically, and the second group of support arms are parallel in a second direction and spaced both horizontally and vertically, where the first direction is parallel to or intersects with the second direction.

In some embodiments, the support frame and the support arms each are made of stainless steel.

In some embodiments, the thermal fluid is heated gaseous medium or saturated vapor.

In some embodiments, a length of the support arm is larger than or equal to a width of the first channel.

In some embodiments, the support frame may further coupled to a pipe, and the pipe is optionally connected to a safety relief valve of the adsorption device at top and to a discharging outlet of the adsorption device at bottom.

In some embodiments, the outlet of the first channel is set at the bottom of the support frame for discharging condensate water or exhaust gas.

In some embodiments, the first group of support arms and the second group of support arms are coplanarly arranged as a layer, and the support frame apparatus is provided with a plurality of the layers.

In some embodiments, the plurality of support arms supports a packing layer including a packing unit.

The support frame apparatus according to embodiments of the present disclosure achieves the following advantages.

The support frame apparatus in embodiments of the present disclosure serves as both of a supporting apparatus and a heating apparatus, with a specific support frame structure. Based on such a structure, the thermal fluid in gas or vapor flows in the first channel of the support frame and thus transfers heat to the inside of the whole adsorption device; and with the first and second holes respectively formed in the first channel of the support frame and the second channel of the support arm where the thermal fluid is also accessible, the packing unit filled with adsorbents therein and fixed and supported by the support arms is evenly heated in a simple heat transferring way. Specifically, the support frame is provided with a plurality of support arms coplanarly which uniformly distribute among the inside space of the adsorption device, and it may has many sets of support arms in different planes individually, thus improving the heating efficiency and heat transfer effects.

The support frame apparatus with the specific structure described in this disclosure can not only provide heat for the desorption of adsorbents in time to promote better desorption of the adsorbed carbon dioxide, but also can play a supporting role for the whole adsorption device meanwhile, presenting the advantages of a structure easily to be arranged, heating the packing evenly, high heating efficiency and wide application ranges.

Further, the support frame is adapted to be coupled to an inner wall of the adsorption device and has an inner wall and an outer wall with a certain thickness, which define the first channel therebetween. The first channel provides a flow space and flow path for the thermal fluid, where the thermal fluid enters the support frame via the inlet of the first channel and flows along the first channel, and then flows to the second channel of the support arm. During this, a part of the thermal fluid sprays into the packing layer through the first holes formed in the wall of the support frame and continuously diffuses and exchanges heat with the thermal fluid presented among the packing layer of the adsorption device. Then this part of thermal fluid diffuses continuously, and mixes with another part of the thermal fluid which is sprayed through the second holes arranged at the support arms, for heat transfer. And with these second holes evenly distributed at the support arm, part of the thermal fluid can spray into the chamber and thus heats the adsorbents in the packing layer uniformly, thereby achieving an improvement for the heat transfer and heat exchange efficiencies.

Furthermore, in embodiments of the present disclosure, the support frame may be further connected to a pipe, for discharging exhaust gas or liquid waste during processes of the heat transfer and exchange. Specifically, the thermal fluid, entering the first channel of the support frame via the inlet thereof, and then spraying into the packing layer of the adsorption device therein via the first and second holes for heat transfer and exchange, produces exhaust gas and/or liquid waste discharged via the outlet of the first channel. The discharged exhaust gas and/or liquid waste then flow(s) into the pipe connected to the support frame to be further discharged, where the pipe is connected to a safety relief valve of the adsorption device at top for pressure relief by venting, and is connected to a discharging outlet of the adsorption device at bottom for regularly removing the solid waste and condensate water from the adsorption device.

DRAWING REFERENCES

1—Inlet for a thermal fluid; 2—outlet for discharging condensate water/exhaust gas; 3—support frame; 4—coupled angle; 5—support arm; 6—first hole; 7—pipe; 8—discharging outlet; 9—flow direction of the thermal fluid; 10—safety relief valve; 11—flow path of the thermal fluid.

DETAILED DESCRIPTION

Reference will now be made in detail to embodiments, examples of which are illustrated in the accompanying drawings. The following examples are only exemplary and explanatory and cannot limit the disclosure. It should be noted that the accompanying drawings are in a very simplified form and in a non-precise scale, and are only intended to be a convenient and clear aid to the purpose of illustrating the embodiments of the disclosure.

In the present disclosure, unless specified or limited otherwise, a component "fixed on", "connected to" or "coupled to" another component may refer to direct connections or indirect connections via intervening structures therebetween.

Unless defined otherwise, all technical and scientific terms used herein have the same meaning as is commonly understood by one skilled in the art to which this disclosure belongs. These terms are exemplary to the examples and cannot be construed to limit the present disclosure. The term "and/or" refers to one or more of the items listed, i.e. may be any one of the listed items or the combination thereof.

Figure 1:
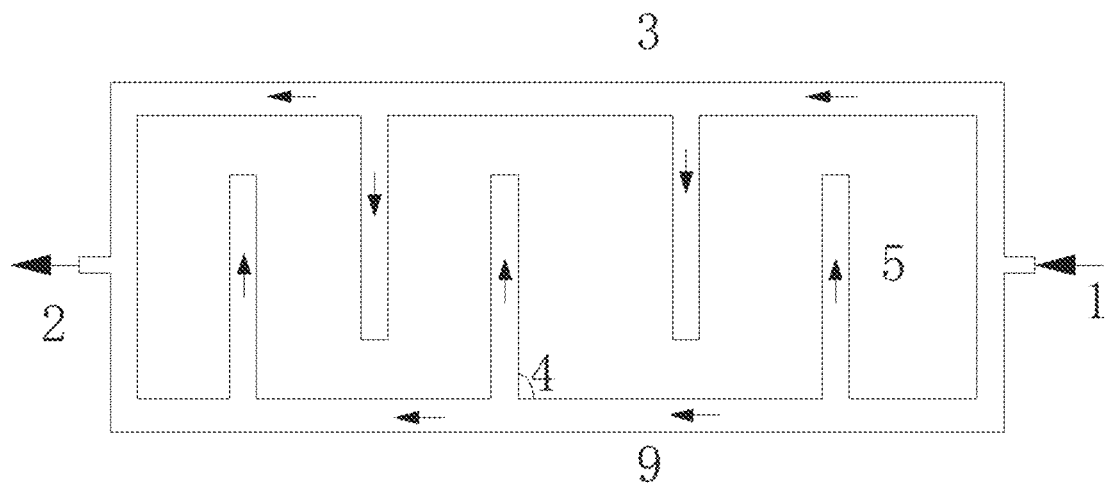
FIG. 1 is a schematic diagram illustrating a plurality of support arms coupled to a support frame and presenting a first direction a first group of the support arms along being parallel to a second direction a second group of the support arms along, according to an embodiment.
Figure 2:
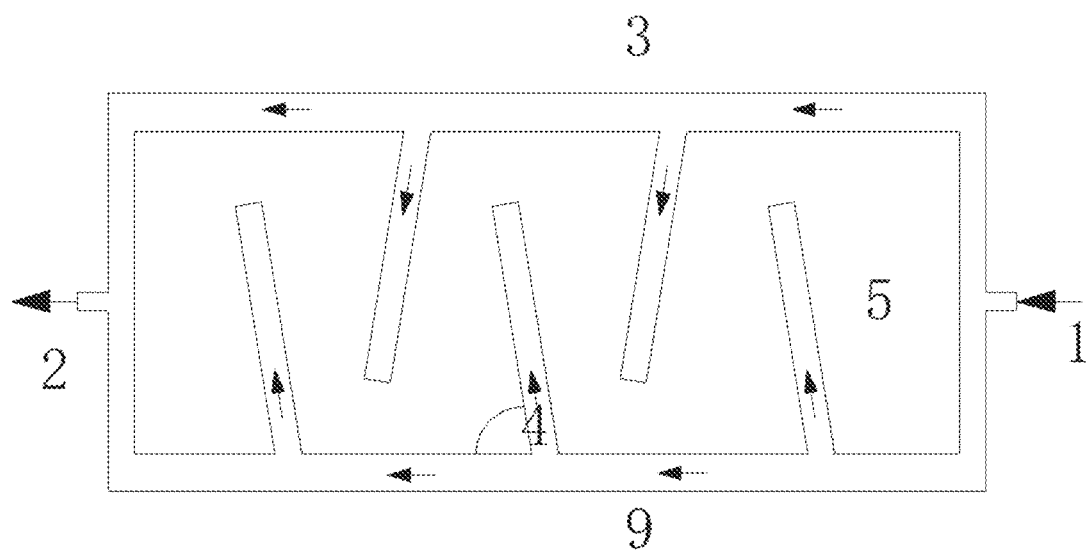
FIG. 2 is a schematic diagram illustrating a plurality of support arms coupled to a support frame and presenting a first direction a first group of the support arms along intersecting with a second direction a second group of the support arms along, according to an embodiment.
Figure 3:
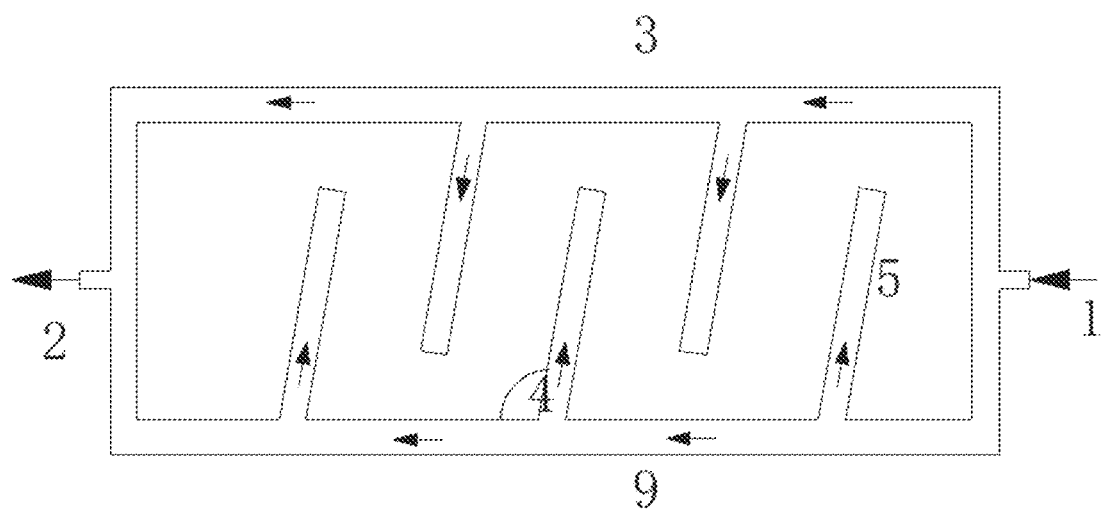
FIG. 3 is a schematic diagram illustrating a plurality of support arms coupled to a support frame and presenting a first direction a first group of the support arms along being parallel to a second direction a second group of the support arms along, according to another embodiment.

The present disclosure provides in embodiments a support frame apparatus for a thermal fluid, as shown in FIG. 1, FIG. 2 and FIG. 3, the support frame apparatus for a thermal fluid may include a support frame 3 and a plurality of support arms 5, where the support frame 3 is adapted to be coupled to an inner wall of an adsorption device and defines a chamber therein. A first channel for accommodating the thermal fluid is formed in a wall of the support frame 3, and the first channel has an inlet 1 for the thermal fluid and an outlet 2 for discharging condensate water/exhaust gas which is opposite to the inlet 1. A plurality of first holes 6 is formed in the wall of the support frame 3 and is opened to the chamber so as to spray the thermal fluid into the chamber. The support frame 3 has a first inner surface and a second inner surface opposed to each other, and the plurality of support arms 5 includes a first group of support arms 5 coupled to the first inner surface and a second group of support arms 5 coupled to the second inner surface. The support arm 5 has a plurality of the second holes communicated to a second channel defined therein, and a coupled angle 4 between the support arm 5 and the support frame 3 may be an acute, right or obtuse angle, meaning that there may be an angle between a direction of the support frame 3 and a first and/or the second direction(s) the first and/or the second group(s) of support arms 5 along respectively, which corresponds to the coupled angle 4 being an acute, right or obtuse angle.

The support frame apparatus in embodiments of the present disclosure has a specific structure, and comparing with the traditional heating technologies in the related art, it serves as both of a supporting apparatus and a heating apparatus. Based on such a structure, the thermal fluid in gas or vapor flows into the first channel of the support frame 3 via the inlet 1 and thus transfers heat to the inside of the whole adsorption device; and with the first holes 6 and second holes respectively formed in the first channel of the support frame 3 and the second channel of the support arm 5 where the thermal fluid is also accessible, the packing unit filled with adsorbents therein and fixed and supported by the support arms 5 is evenly heated in a simple heat transferring way. Specifically, the support frame 3 is provided with a plurality of support arms 5 coplanarly which uniformly distribute among the inside space of the adsorption device, and it may has many sets of support arms 5 in different planes individually, thus improving the heating efficiency and heat transfer effects. The support frame apparatus with the specific structure described in this disclosure can not only provide heat for the desorption of adsorbents in time to promote better desorption of the adsorbed carbon dioxide, but also can play a supporting role for the whole adsorption device meanwhile, presenting the advantages of a structure easily to be arranged, heating the packing evenly, high heating efficiency and wide application ranges.

In embodiments of the present disclosure, the support arms 5 are disposed within the chamber and each having a first end coupled to the support frame 3 and a second end extended inwardly from the support frame 3, for supporting a packing layer. The support arms 5 define a second channel therein fluid communicated to the first channel, and having a plurality of second holes communicated to the second channel and opened to the chamber so as to spray the thermal fluid into the chamber. The second channel and the second holes provide the thermal fluid with a flow path, thus transferring heat to the inside of the adsorption device more uniform while supporting the packing layer.

In some embodiments of the present disclosure, the first group of support arms 5 are parallel to each other and spaced both horizontally and vertically, and the second group of support arms 5 are parallel to each other and spaced both horizontally and vertically.

In some embodiments of the present disclosure, the first group of support arms 5 are parallel in the first direction and spaced both horizontally and vertically, and the second group of support arms 5 are parallel in the second direction and spaced both horizontally and vertically, where the first direction is parallel to or intersects with the second direction.

According to embodiments of the present disclosure, the support frame 3 is adapted to be coupled to the inner wall of the adsorption device and has an inner wall and an outer wall with a certain thickness, which define the first channel therebetween. The first channel provides a flow space and flow path for the thermal fluid, where the thermal fluid enters the support frame 3 via the inlet 1 of the first channel and flows along the first channel, and then flows to the second channel of the support arm 5. During this, a part of the thermal fluid sprays into the packing layer through the first holes 6 formed in the wall of the support frame 3 and continuously diffuses and exchanges heat with the thermal fluid presented among the packing layer of the adsorption device. Then this part of thermal fluid diffuses continuously, and mixes with another part of the thermal fluid which is sprayed through the second holes arranged at the support arms 5, for heat transfer. And with these second holes evenly distributed at the support arm 5, part of the thermal fluid can spray into the chamber and thus heats the adsorbents in the packing layer uniformly, thereby achieving an improvement for the heat transfer and heat exchange efficiencies.

In some embodiments of the present disclosure, a length of the support arm 5 is larger than or equal to a width of the first channel, which ensures and improves heat transfer in the chamber, and strengthens the support to the packing layer meanwhile.

Figure 5:
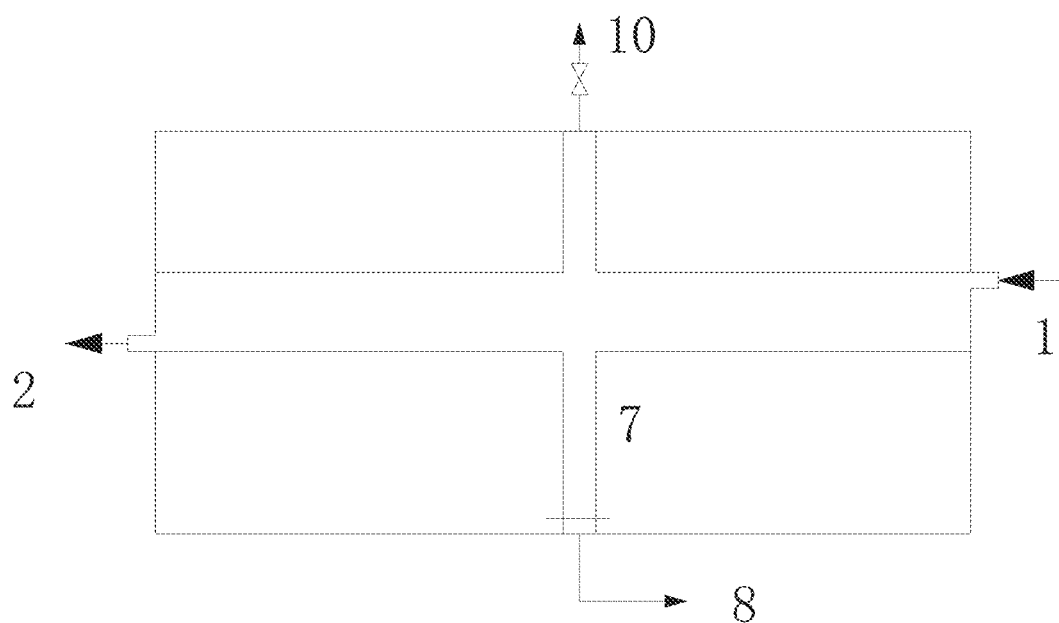
FIG. 5 is a side view of a support frame connected to a pipe according to an embodiment.
Figure 6:
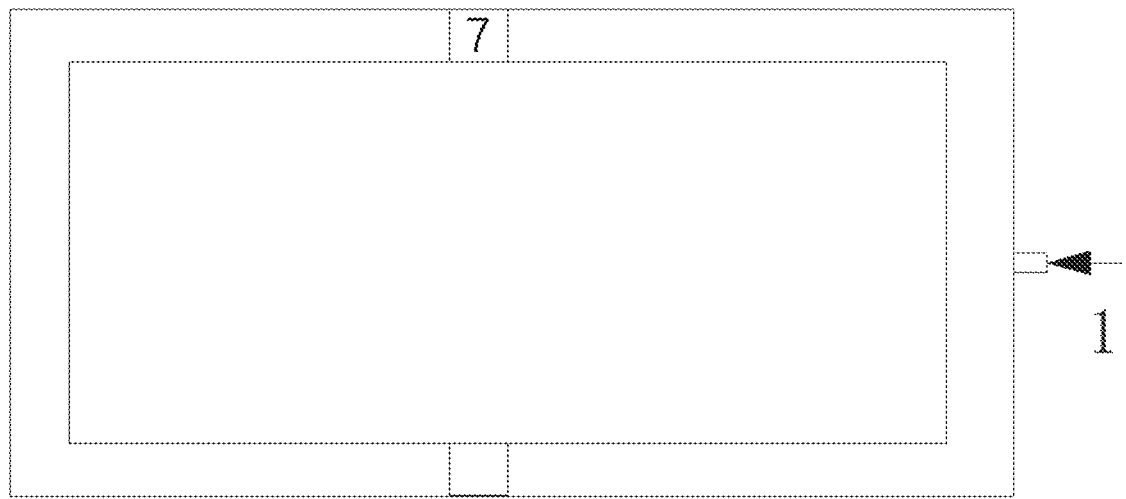
FIG. 6 is a top view of a support frame connected to a pipe according to an embodiment.

In some embodiments of the present disclosure, as shown in FIG. 5 and FIG. 6, the support frame 3 may be further connected to a pipe 7, for discharging exhaust gas or liquid waste during processes of the heat transfer and exchange. Specifically, the thermal fluid, entering the first channel of the support frame 3 via the inlet 1 thereof, and then spraying into the adsorption device and the packing layer therein via the first holes 6 and second holes for heat transfer and exchange, produces exhaust gas and/or liquid waste discharged via the outlet 2 of the first channel. The discharged exhaust gas and/or liquid waste then flow(s) into the pipe 7 connected to the support frame 3 to be further discharged, where the pipe 7 is connected to a safety relief valve 10 of the adsorption device at top for pressure relief by venting, and is connected to a discharging outlet 8 of the adsorption device at bottom for regularly removing the solid waste and condensate water from the adsorption device.

In some embodiments, the pipe 7 is arranged vertically.

In some embodiments, the support frame 3, the support arms 5 and the pipe 7 each may be made of stainless steel. In some embodiments, the stainless steel may be 304 stainless steel.

In some embodiments, the thermal fluid is heated gaseous medium, saturated vapor or the like being a fluid medium carrying certain heat and thus providing heat to the packing layer of the adsorption device.

In some embodiments, the outlet 2 of the first channel set at the bottom of the support frame 3 for discharging condensate water or exhaust gas.

In some embodiments, the first group of support arms 5 and the second group of support arms 5 are coplanarly arranged as a layer, and the support frame apparatus is provided with a plurality of the layers.

EXAMPLE

Figure 4:
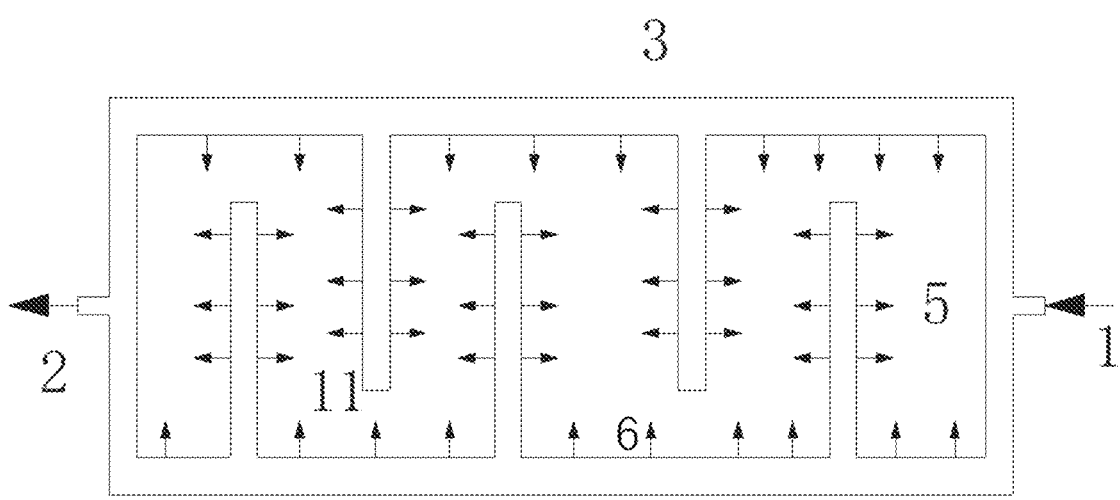
FIG. 4 is a schematic diagram illustrating a flow path of the thermal fluid in a support frame apparatus according to an embodiment.

As shown in FIG. 1 and FIG. 4, a structure of the support frame apparatus for a thermal fluid and its working principle are described as follows.

The thermal fluid, such as heated gaseous medium or saturated vapor carrying certain heat, enters a support frame 3 via an inlet 1 of a first channel defined by the support frame 3 therein, and then flows into support arms 5 along with a flow direction 9 of the thermal fluid. During this, a part of the thermal fluid sprays into a packing layer through second holes evenly distributed at the support arm 5, so as to provide heat to a packing material in the packing layer, and this part of the thermal fluid then diffuses into the inside of an adsorption device. Meanwhile, another part of the thermal fluid flowing in the first channel sprays into the inside of the adsorption device as well, through first holes 6 formed in the wall of the support frame 3, mixing with the diffused thermal fluid to improve the heat the diffused thermal fluid carried, followed by heat exchanging with the packing layer. Exhaust gas or liquid waste produced during processes of the heat transfer and exchange may be removed from the support frame apparatus via an outlet 2 for discharging condensate water/exhaust gas (also refer to an outlet for discharging exhaust gas/liquid waste). Lighter gases may be discharged as needed from the top of a pipe 7 which is optionally connected to the support frame 3, via a safety relief valve 10, while heavier heat exchange products, such as condensate, as well as solid materials scattered from the packing layer and solid impurities inside the adsorption device, may be discharged from the device by a discharging outlet 8 of the adsorption device. That is a complete heat supply based on the support frame apparatus for a thermal fluid according to Examples of the present disclosure.

FIG. 1, FIG. 2 and FIG. 3 are schematic diagrams illustrating the support arms 5 coupled to the support frame 3 in different ways. As shown in FIG. 1, FIG. 2 and FIG. 3, a coupled angle 4 between the support arm 5 and the support frame 3 may be a right (as shown in FIG. 1) angle or non-right angles (as shown in FIG. 2 and FIG. 3). In other words, there may present an angle between a direction of the support frame 3 and a first and/or the second direction(s) the first and/or the second group(s) of support arms 5 along respectively, which corresponds to the coupled angle 4 being an acute, right or obtuse angle and may be determined as desired. Moreover, the first direction a first group of the support arms 5 along may be parallel to the second direction a second group of the support arms 5 along (as shown in FIG. 1 and FIG. 3); or the first direction the first group of the support arms 5 along may intersect with the second direction the second group of the support arms 5 along (as shown in FIG. 2). That may also be determined as desired.

FIG. 4 shows a flow path 11 of the thermal fluid in a support frame apparatus according to Examples of the present disclosure. As shown in FIG. 4, the thermal fluid enters the support frame 3 via the inlet 1 of a first channel defined by the support frame 3 therein, and then flows into support arms 5 along with a flow direction of the thermal fluid therein. During this, a part of the thermal fluid sprays into the inside of the adsorption device through first holes 6 formed in the wall of the support frame 3, and another part of the thermal fluid flowing into support arms 5 sprays into a packing layer through second holes evenly distributed at the support arm 5. The thermal fluid sprayed via the first holes 6 provide heats to the inside of the adsorption device by diffusing in the packing layer, and it then meets and mixes with the thermal fluid sprayed via the second holes which provides heat to the packing layer, so as to exchange heat among them. The second holes evenly distributed at the support arm 5 makes the packing layer evenly heated and prolongs the residence time of the thermal fluid in the adsorption device, thereby improving the heat transfer and heat exchange efficiencies.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A support frame apparatus for a thermal fluid, comprising:
    a support frame adapted to be coupled to an inner wall of an adsorption device, and defining a chamber therein, a first channel for accommodating the thermal fluid being formed in a wall of the support frame, the first channel having an inlet and an outlet opposite to the inlet, and a plurality of first holes being formed in the wall of the support frame and being opened to the chamber so as to spray the thermal fluid into the chamber; and
    a plurality of support arms disposed within the chamber and each having a first end coupled to the support frame and a second end extended inwardly from the support frame, the plurality of support arms defining a second channel therein fluid communicated to the first channel, and the plurality of support arms having a plurality of second holes communicated to the second channel and opened to the chamber so as to spray the thermal fluid into the chamber;
    wherein the support frame has a first inner surface and a second inner surface opposed to each other, the plurality of support arms comprise a first group of support arms coupled to the first inner surface and a second group of support arms coupled to the second inner surface;
    wherein the first group of support arms are parallel to each other and spaced both horizontally and vertically, and the second group of support arms are parallel to each other and spaced both horizontally and vertically; and
    wherein the first group of support arms are parallel in a first direction and spaced both horizontally and vertically, and the second group of support arms are parallel in a second direction and spaced both horizontally and vertically, the first direction being parallel to or intersecting with the second direction.

2. The support frame apparatus according to claim 1, wherein the support frame and the plurality of support arms are each made of stainless steel.

3. The support frame apparatus according to claim 1, wherein the thermal fluid is heated gaseous medium or saturated vapor.

4. The support frame apparatus according to claim 1, wherein a length of each of the plurality of support arms is larger than or equal to a width of the first channel.

5. The support frame apparatus according to claim 1, wherein:
    the support frame is further coupled to a pipe; and
    the pipe is connected to a safety relief valve of the adsorption device at top and to a discharging outlet of the adsorption device at bottom.

6. The support frame apparatus according to claim 1, wherein the first group of support arms and the second group of support arms are coplanarly arranged as a layer, and the support frame apparatus is provided with a plurality of the layers.

* * * * *